United States Patent
Vernon et al.

(10) Patent No.: US 8,985,382 B2
(45) Date of Patent: Mar. 24, 2015

(54) FOOD CONTAINER WITH CUP RECESS

(71) Applicant: Eco-Products, Inc., Boulder, CO (US)

(72) Inventors: Luke Vernon, Boulder, CO (US);
Wendell Simonson, Boulder, CO (US);
Gabriel Collins, Golden, CO (US)

(73) Assignee: Eco-Products, Inc., Boulder, CO (US)

( * ) Notice: Subject to any disclaimer, the term of this patent is extended or adjusted under 35 U.S.C. 154(b) by 0 days.

(21) Appl. No.: 13/669,748

(22) Filed: Nov. 6, 2012

(65) Prior Publication Data

US 2014/0021206 A1  Jan. 23, 2014

Related U.S. Application Data

(60) Provisional application No. 61/672,627, filed on Jul. 17, 2012.

(51) Int. Cl.
*B65D 51/28* (2006.01)
*A47G 19/06* (2006.01)

(52) U.S. Cl.
CPC ............... *A47G 19/06* (2013.01); *B65D 51/28* (2013.01)
USPC ........ 220/574.1; 220/212; 220/521; 220/735; 206/508; 206/509

(58) Field of Classification Search
CPC ................................. B65D 51/28; A47G 19/06
USPC ........ 220/521, 212, 735, 574.1; 206/508, 509
See application file for complete search history.

(56) References Cited

U.S. PATENT DOCUMENTS

| | | | | |
|---|---|---|---|---|
| 4,930,637 A | * | 6/1990 | DeRoseau | 206/541 |
| 5,174,452 A | * | 12/1992 | Wang | 206/542 |
| 5,904,266 A | * | 5/1999 | Tedeschi, Jr. | 220/521 |
| D660,659 S | * | 5/2012 | Cohen | D7/629 |
| 8,317,024 B1 | * | 11/2012 | Persi | 206/508 |
| 2004/0056036 A1 | * | 3/2004 | Tsai | 220/556 |
| 2004/0112896 A1 | * | 6/2004 | Lewis | 220/212 |
| 2007/0000922 A1 | * | 1/2007 | Vovan et al. | 220/4.27 |
| 2010/0258574 A1 | * | 10/2010 | Bentley | 220/592.2 |

* cited by examiner

*Primary Examiner* — Elizabeth Volz
(74) *Attorney, Agent, or Firm* — Holland & Hart LLP

(57) ABSTRACT

A food container includes a base and a lid, and the lid may have a recess configured to receive a second container. The base may comprise a formed cavity that provides a bowl into which food or other items may be placed. The recess in the lid may receive a cup containing another item, such as a condiment or topping. The cup with the condiment or topping may be inserted into the recess, and removed from the recess, without removing the lid from the base. The lid and/or the base may be formed from any suitable materials, such as a transparent or non-transparent plastic material, and/or a compostable material.

22 Claims, 12 Drawing Sheets

FOOD CONTAINER WITH CUP RECESS

CROSS-REFERENCE TO RELATED APPLICATIONS

This application claims priority to U.S. Provisional Patent Application Ser. No. 61/672,627, filed on Jul. 17, 2012, entitled "FOOD CONTAINER WITH CUP RECESS," the entire disclosure of which is incorporated herein by reference.

BACKGROUND

The present invention relates to food containers in general and, in particular, to food containers capable of receiving separate containers with related items.

Food containers are often used for transporting and/or storing food for consumption from a food serving establishment to a location that the food will be consumed, stored, or used in further food preparation. For example, a consumer may order a meal from a restaurant or other food serving establishment, which is provided in a food container. In some instances, a food serving establishment may have some types of foods prepared and located in food containers that a consumer may select for either immediate consumption, or transport to another location for consumption.

Many types of foods are provided with condiments and/or toppings that are selected and added to a main dish as desired by the consumer. For example, a salad may be provided with salad dressing. The type of condiment or topping to be used on a particular main dish is often selected from a number of different options, depending upon the consumer's taste. Continuing with the salad example, a consumer may select from a number of different salad dressings for the salad, the selection may depend upon the consumer's particular tastes and/or available options for salad dressings.

Additionally, many consumers want to reduce the amount of resources that they are responsible for consuming, including both renewable and non-renewable resources. Such reduction of resources may allow for the reduction in an individuals 'carbon footprint,' allowing for a more sustainable community and world. Such reduction of resources may be accomplished through a number of activities, including through the increased recycling of materials and increased use of compostable materials, such as described above. Additionally, such consumers may desire to use products formed from recycled materials and otherwise that allow the reduction of consumed resources. For example, consumers may desire to use products formed from what would otherwise be waste material.

SUMMARY

Various embodiments of the present disclosure provide a food container comprising a base and a lid, the lid comprising a recess configured to receive a second container. In some embodiments, the base is comprised of a formed cavity that provides a bowl into which food or other items may be placed. In some embodiments, the recess is configured to receive a cup containing a food item that accompanies a food located in the base, such as a condiment or topping, for example. The cup with the condiment or topping may be inserted into the recess, and removed from the recess, without removing the lid from the base. The lid may be formed from a transparent plastic material, and the base may be formed of a compostable material, in some embodiments.

In other embodiments, the lid may comprise two or more recesses that are configured to receive other containers. The two or more recesses in such embodiments may be different sizes and configured to receive different sized other containers. In some embodiments, the lid may comprise two or more recesses, one or more of which being configured to receive a second container and one or more of which being configured to receive a cutlery item such as a utensil. In some embodiments, a closure mechanism may be included that may secure a container lid to a container, and also secure one or more utensils to the container. Such a closure mechanism may also cover a recess in the lid that is configured to receive a second container. In still further embodiments, one or more inserts may be placed in a container, with the insert(s) providing one or more cavities into which food or other items, such as cutlery, may be placed. In some embodiments, an insert may include a lip that rests on a corresponding lip of a base, and a lid may be coupled with the lip of the base and thereby secure the insert within the base.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that aspects and elements described with respect to certain embodiments may be combined in various other embodiments.

Food containers of various embodiments described herein provide containers having a base and a lid. The base, according to some embodiments, comprises a formed cavity that may hold food items. The lid, according to some embodiments, comprises a recess or cavity that may receive a cup or other container. The cup or other container may contain a condiment, sauce, dressing, or topping, for example, for a food item contained in the base.

Such a cup or other container may hold, for example, salad dressing for use on a salad that may be in located in the base. Numerous different types of salad dressing are available and often offered at food serving establishments, as is well known. Often, salad dressing, and/or other toppings, are placed in a container or pouch and made available to the consumer. Such a container for salad dressing may be a small soufflé cup, for example. Thus, containers according to various embodiments may enable the selection and transport of such dressing (and/or other topping) in an efficient and convenient manner.

Using prior containers, the consumer would select a salad dressing and carry the cup or pouch separately from the container, which may cause difficulty if the consumer is carrying one or more other items as well, such as a drink or other item. In some cases, salad dressing and/or one or more toppings (e.g., olives or croutons) may be placed inside the container, thus not requiring that the consumer carry anything separately from the container. However, in such situations the consumer is not able to select the particular type of salad dressing or toppings, or has to open the container to insert the cup or pouch with the dressing or topping. Embodiments described herein thus provide for enhanced convenience and efficiency relative to prior containers used for such purposes.

Figure 1:
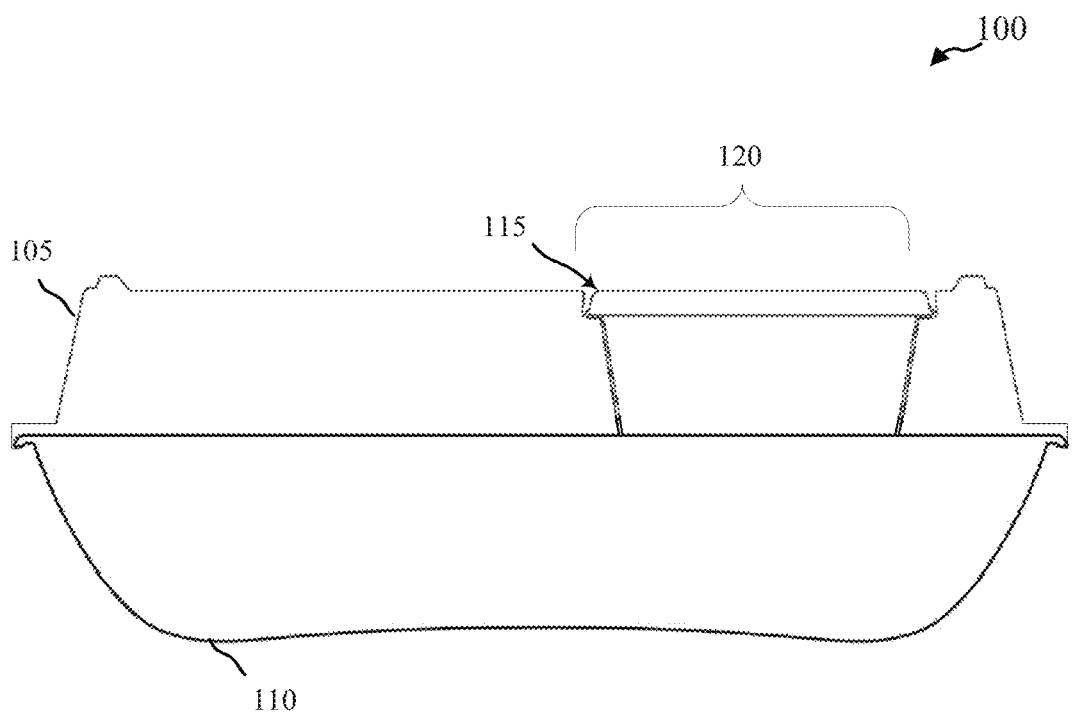
FIG. 1 is a side view of a food container according to various embodiments of the disclosure.

With reference now to FIG. 1, a food container 100 according to various embodiments is described. In the example of FIG. 1, container 100 includes a lid 105 and a base 110. The base 110, according to some embodiments, comprises a unitary formed recess that may receive, for example, a food product. Base 110 is illustrated as a bowl-shaped cavity, although other shapes may be employed, such as a square cavity or cavity with two straight edges and two rounded or radiused edges, to name but two examples. One skilled in the art will readily recognize that numerous different shapes may be employed based of desired characteristics of the container 100 and the item(s) to be transported and/or stored in the container 100. The lid 105, according to various embodiments, may receive a cup 115 in a cavity or recess 120 that is formed in the lid 105. While a separate lid 105 and base 110 are illustrated here, concepts described herein are equally applicable to containers that have a hinged or foldable connection between a lid and base, or to containers having two or more flaps that are folded over an opening in a base to close the container.

Figure 2:
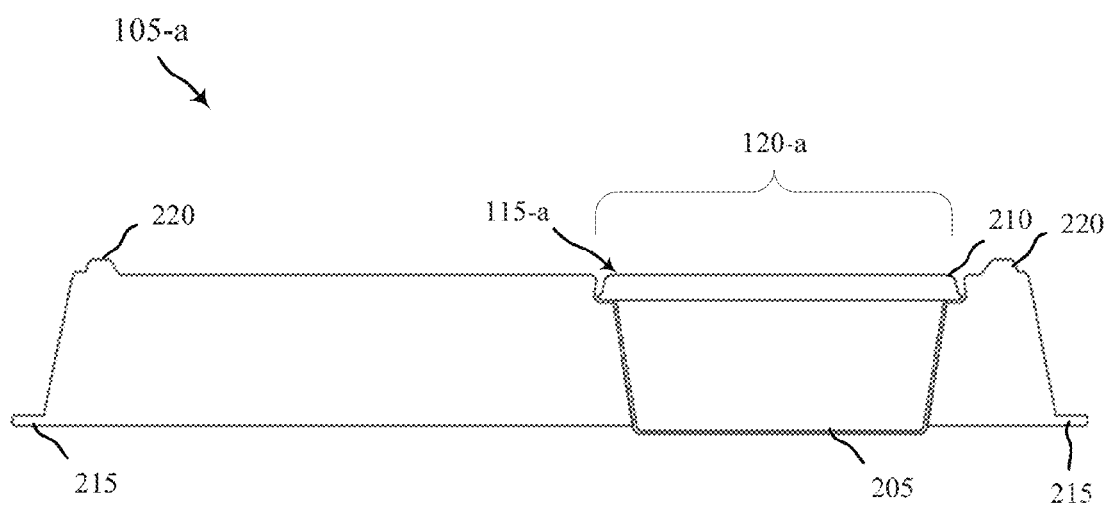
FIG. 2 is a side view of a lid according to various embodiments.

With reference now to FIG. 2, a lid 105-*a* according to some embodiments is described in more detail. Lid 105-*a* may receive a cup 115-*a* in cavity or recess 120-*a*. In the example of FIG. 2, the cup 115-*a* is a soufflé cup having a cup portion 205 and a cover 210 that may be secured to the cup portion 205. The recess 120-*a* is sized and shaped to receive cup 115-*a* by simply dropping the cup 115-*a* into the recess 120-*a*. The recess 120-*a* may be deep enough to allow the cup 115-*a* to sit in the recess 120-*a* with the top of the cover 210 being at approximately the same height as the portions of lid 105—that are adjacent to the recess 120-*a*. Lid 105-*a* also includes a lip 215 and an upward projection 220 that extends around a circumference of the top of the lid 105-*a*. In some embodiments, lip 215 has a detent or other securement mechanism on an interior portion thereof that may be coupled with a complementary portion of base 110 to secure the lid 105-*a* to the base 110. In some embodiments, the upward projection 220 may be sized and shaped to fit with a corresponding groove or ledge in a base, in order to provide more stable stacking of containers. Lid 105-*a* may be made of any of a number of suitable materials, such as plastic, foam, or a paper or pulp based material. In some embodiments, lid 105-*a* is formed of a transparent plastic material to provide convenient viewing of food items located in the container.

Figure 3:
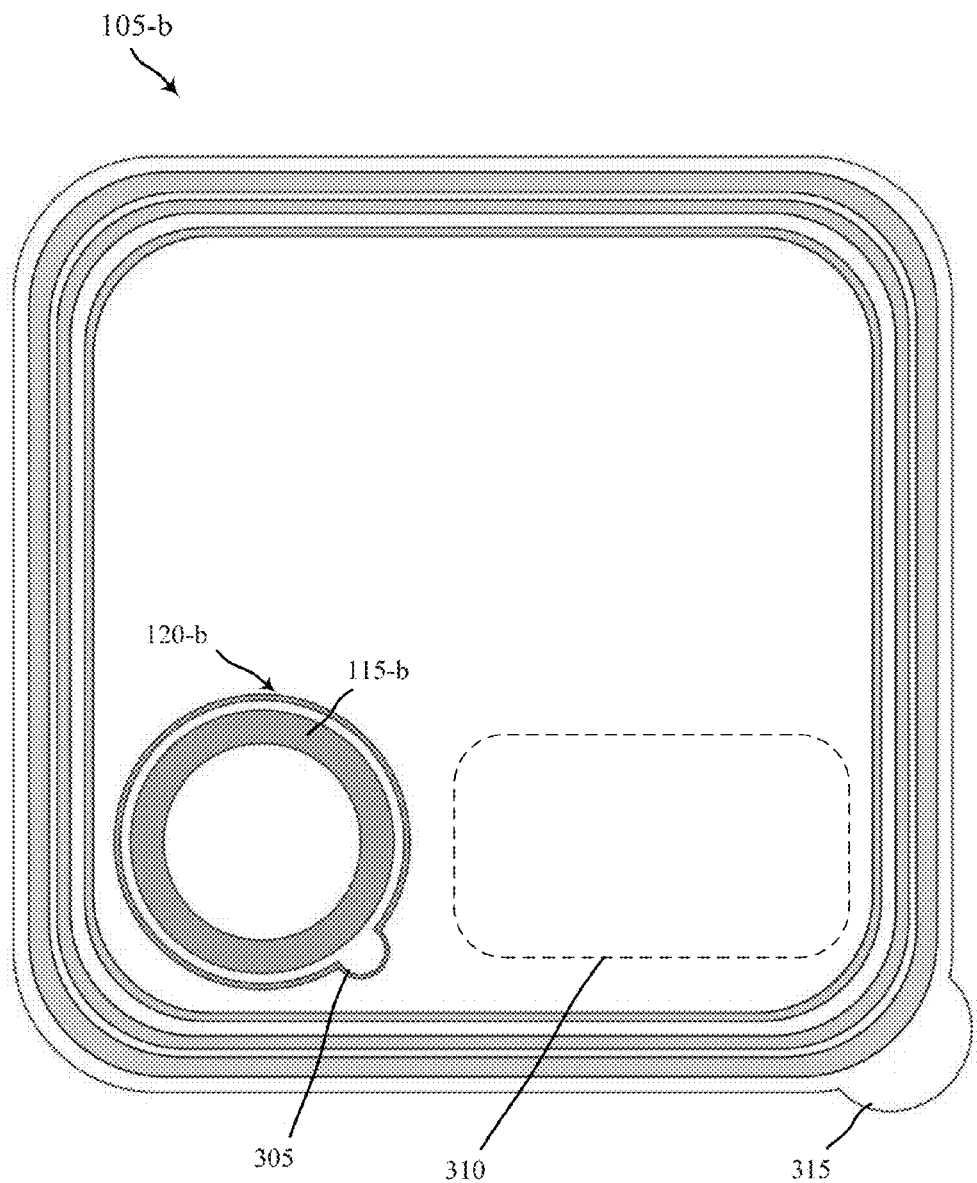
FIG. 3 is a top view of a lid according to various embodiments.

FIG. 3 is a top view of a lid 105-*b* according to some embodiments. Lid 105-*b* may receive a cup 115-*b* in recess 120-*b*. In this embodiment, the lid 105-*b* has a generally square configuration with a generally circular recess 120-*b* that receives cup 115-*b*. The recess 120-*b*, according to some embodiments, includes a channel 305 extending away from the cup 115-*b* that may be used to assist in removing cup 115-*b* from the recess 120-*b*. In some embodiments, a label 310 may be affixed to the lip 105-*b*, which may include information about the contents of the container, for example. Lid 105-*b* may also include a tab 315 that may assist in the removal of lid 105-*b* from an associated base.

Figure 4:
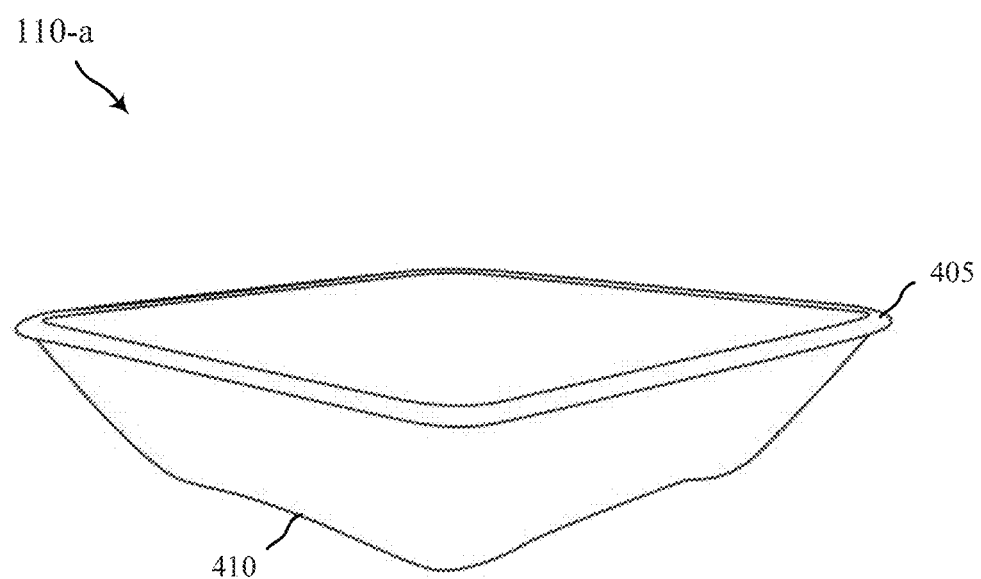
FIG. 4 is a perspective view of a base according to various embodiments.
Figure 5:
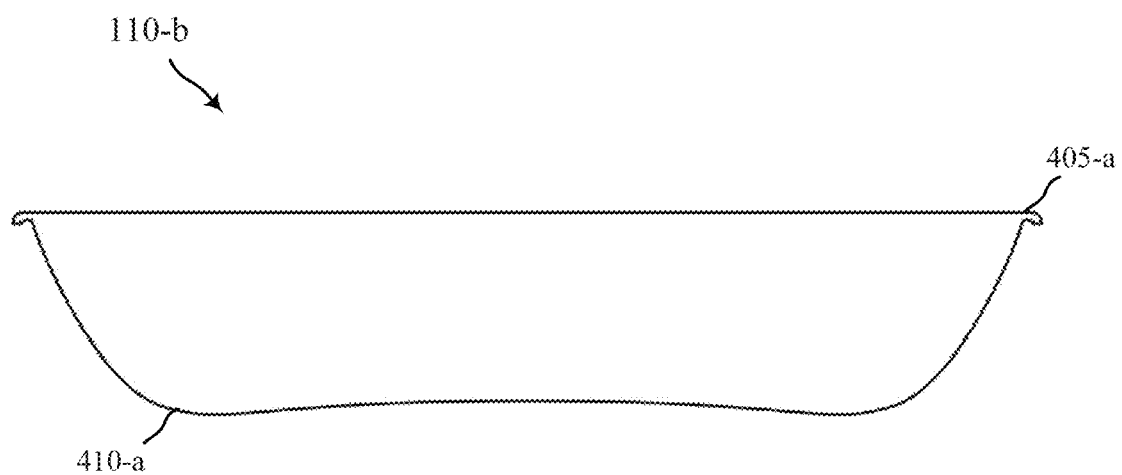
FIG. 5 is a side view of a base according to various embodiments.

With reference now to FIGS. 4 and 5, a base 110-*a* according to various embodiments is described. FIG. 4 is a perspective view of a base 110-*a*, and FIG. 5 is a cross-sectional view of base 110-*a*. The base 110-*a* of FIGS. 4-5 has a generally square shaped top opening that has a lip 405 extending therefrom that may engage with a detent or other securement mechanism of lid 105. The base 110-*a* includes a formed cavity 410 having sloping sidewalls to form a bowl, although other shapes may be used as will be readily understood by one of skill in the art.

In some embodiments, the base 110-*a* may also include one or more dividing partitions formed as part of the formed cavity. Such dividing partitions may prevent food items from commingling when placed in the container. Dividing partitions may extend from the bottom of the base 110 to provide a partition between different areas of the bottom of the base 110. In some embodiments, the inside surfaces of base 110 may be coated with a laminate to help prevent liquid from the contents of the container from penetrating the material that is used to form the container. In other embodiments, an insert may be placed in the container 100, and such an insert may be sized and shaped to fit within the base 110-*a*, and also may include dividing partitions. In such a manner, a particular container 100 may be used with different inserts which may have different, or no, dividing partitions based on the particular use desired for the container 100. In some embodiments, the insert may be formed of compostable or biodegradable material, such as Polylactic acid (PLA) plastic, for example.

Figure 6:
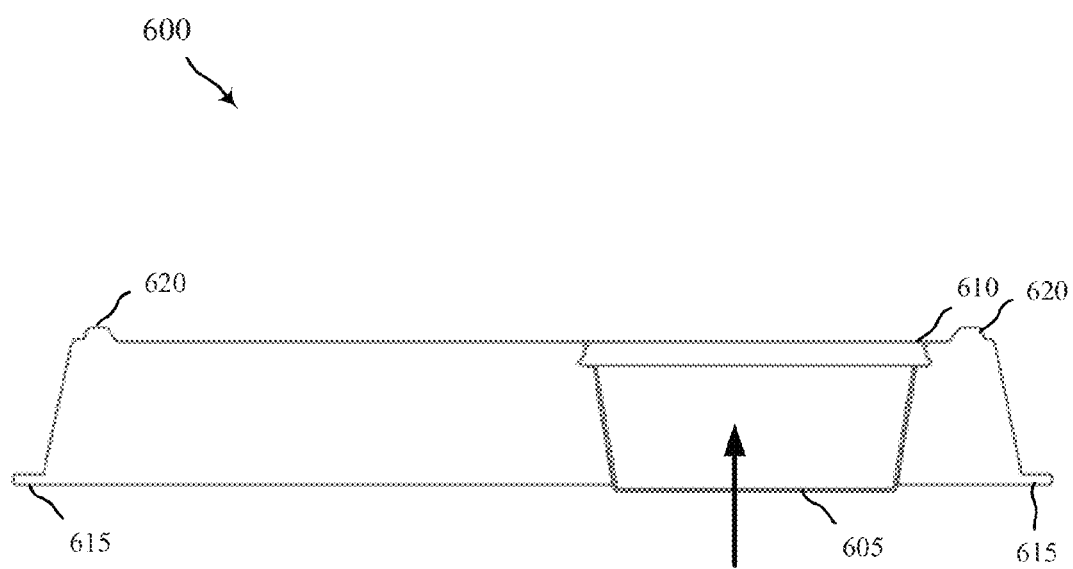
FIG. 6 is a side view of another lid according to various embodiments.

With reference now to FIG. 6, a lid 600 according to some embodiments is described in more detail. Lid 600 according to this example may have a cup 605 secured to a molded recess 610 that is molded into the lid 600 and is configured similarly to a traditional lid for cup 605. In the example of FIG. 6, the cup 605 is a soufflé cup that may contain, for example, salad dressing or some other topping/condiment. The molded recess 610 is sized and shaped to receive cup 605 by simply inserting the cup into the recess, thus holding the cup in place and keeping the material in the cup 605 separated from other food within the container. Lid 600, similarly as the lid described above, also includes a lip 615 and an upward projection 620 that extends around a circumference of the top of the lid 600. In some embodiments, lip 615 has a detent or other securement mechanism on an interior portion thereof that may be coupled with a complementary portion of a base to secure the lid 600 to the base. In some embodiments, the upward projection 620 may be sized and shaped to fit with a corresponding groove or ledge in a base, in order to provide more stable stacking of containers. Lid 600 may be made of any of a number of suitable materials, such as plastic, foam, or a paper or pulp based material. In some embodiments, lid 600 is formed of a transparent plastic material to provide convenient viewing of food items located in the container.

Figure 7:
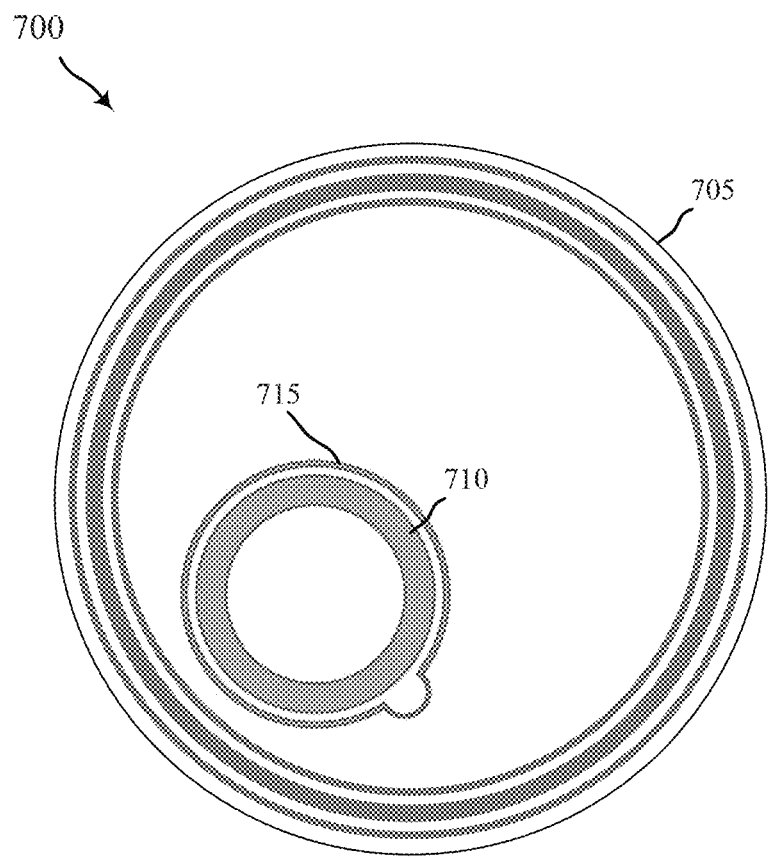
FIG. 7 is a top view of another lid according to various embodiments.
Figure 8:
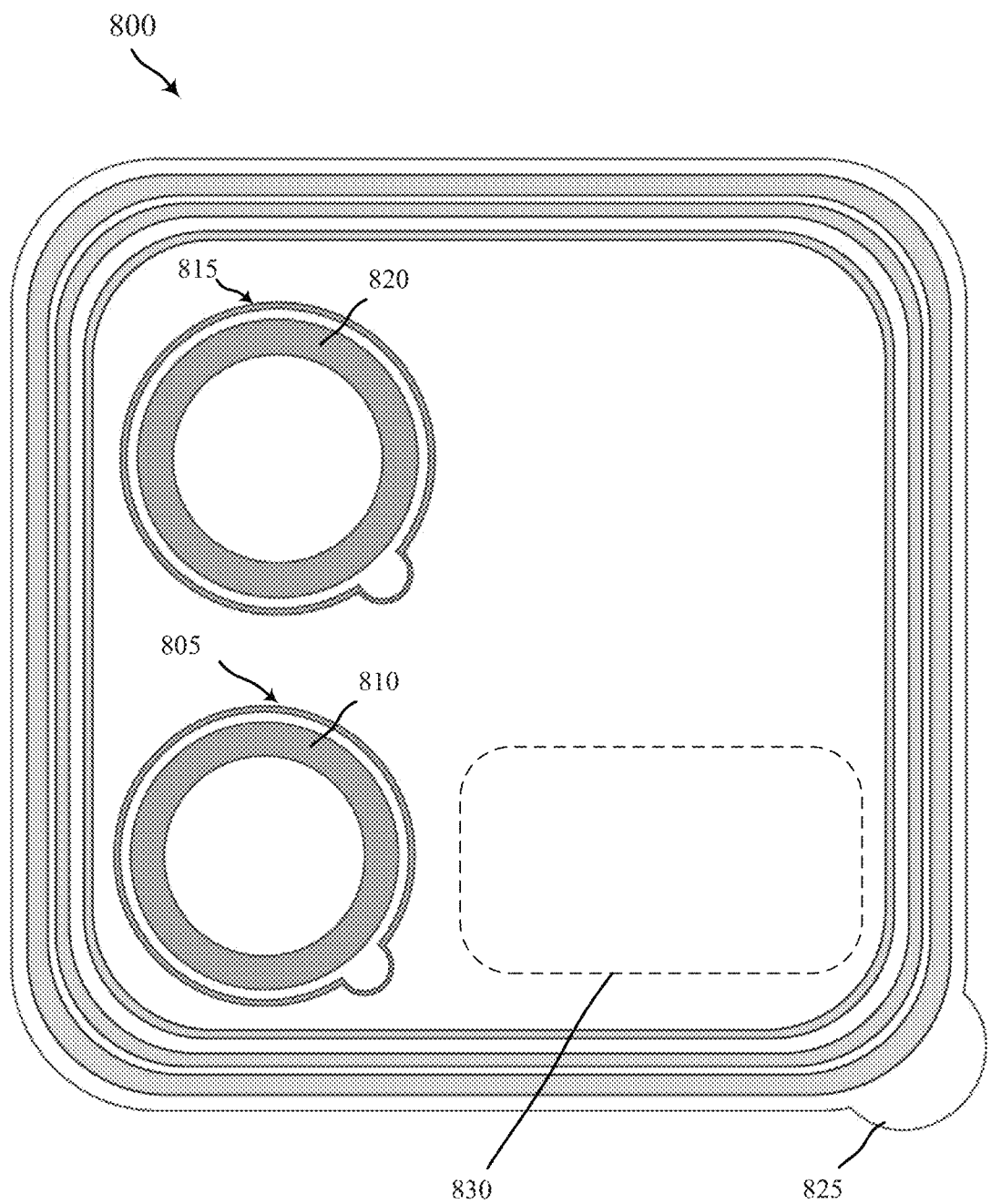
FIG. 8 is a top view of another lid according to various embodiments.

As noted above, containers of the present disclosure may have any of numerous shapes and configurations, depending upon the anticipated use of the container. FIG. 7 illustrates one example of a lid 700 for a circular container. In this embodiment, an outside circular lip 705 may engage with a circular base, and secure lid 700 thereto. The lid 700 may receive cup 710 in recess 715, similarly as described above. FIG. 8 illustrates a lid 800 according to various other embodiments, which includes multiple cavities 805, 810, which may receive cups 815 and 820 in a similar manner as described above. In such embodiments, multiple dressings and/or toppings may be included in cups 815 and 820, such as a salad dressing and a topping (e.g., croutons, cheese, olives, etc.) for a salad, for example. Lid 800 may include a tab 825 and label 830, and may engage with a base similarly as described above. In some embodiments, cavities 805, 810, may have different shapes and/or sizes, depending upon the desired contents to be included in one or more containers that are to be placed in the cavities 805, 810. For example, one recess may be circular and configured to receive a cup, and another recess may be rectangular and configured to receive a rectangular-shaped bowl or packet of dressing or other accompaniment for the food carried in the container. For example, if sushi is contained in the base of the container, a cup may include soy sauce with the separate bowl having wasabi and ginger in separate compartments thereof. In such an embodiment, the lid may also include a recess for chop sticks as well. In still further embodiments, the lid and base may be connected to each other through a common edge or other foldable connection, thereby having a "clamshell" type of configuration.

Figure 9:
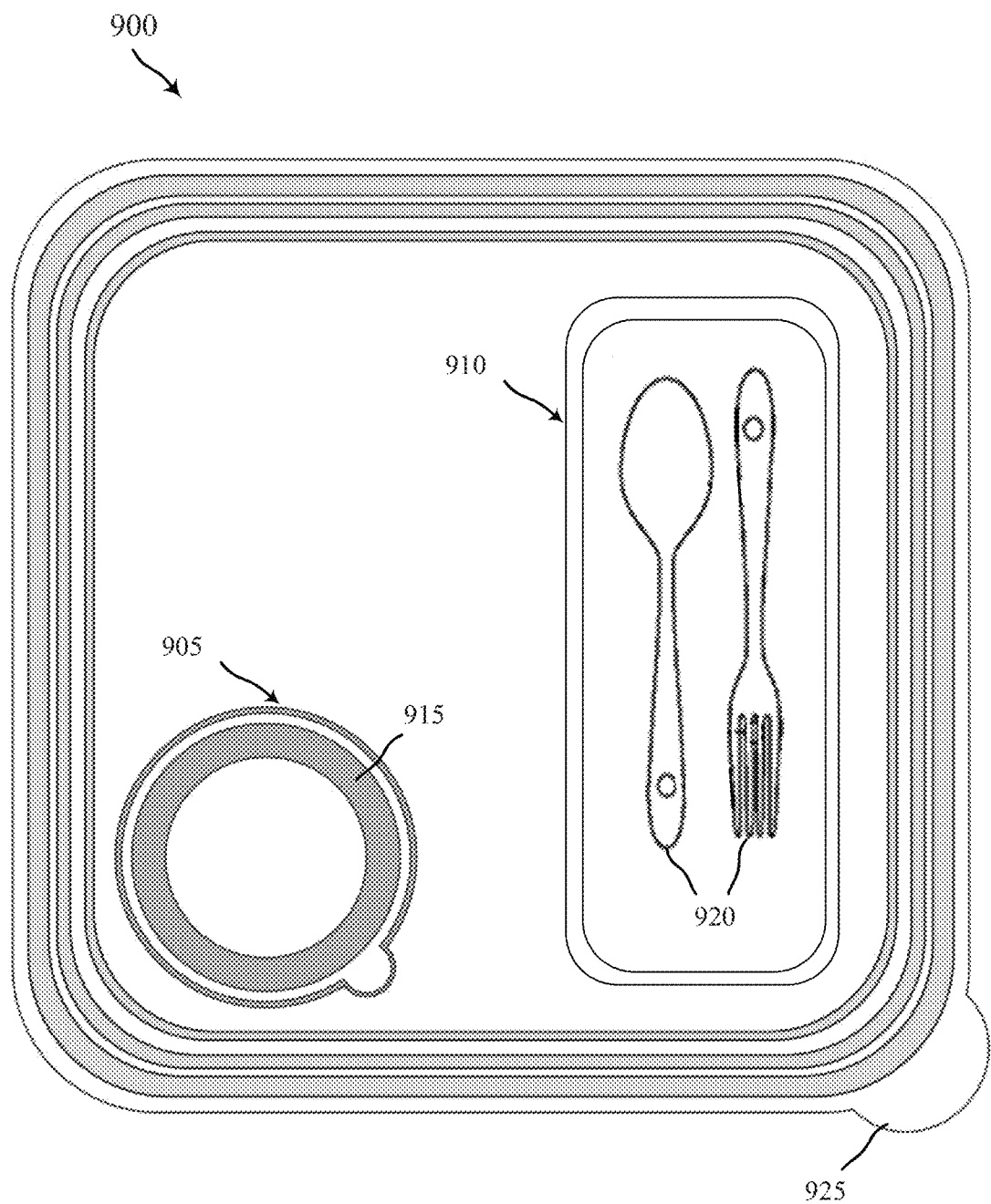
FIG. 9 is a top view of a lid having cutlery and container recesses according to various embodiments.

FIG. 9 illustrates another lid 900 according to various embodiments. In the example of FIG. 9, lid 900 includes multiple cavities 905, 910, into which different items may be placed. In the example of FIG. 9, recess 905 may receive a cup, similarly as described above, and recess 910 may receive cutlery 920, such as a fork and spoon as illustrated, although it will be understood that other items of cutlery may be placed in such a recess 901. In some embodiments, recess 910 is sized to receive a packet that may contain, for example, cutlery, one or more napkins, and/or one or more seasoning packets such as salt or pepper packets. Such a recess 910 for cutlery 920 (and/or other items) may be used in conjunction with any of the lids described herein, and may be deep enough such that the cutlery does not extend above the plane of the lid 900 that surrounds the recess 910, thereby allowing for convenient stacking of containers and lids which have items in cavities 905, 910. Lid 900 may include a tab 925, and may engage with a base similarly as described above.

Figure 10:
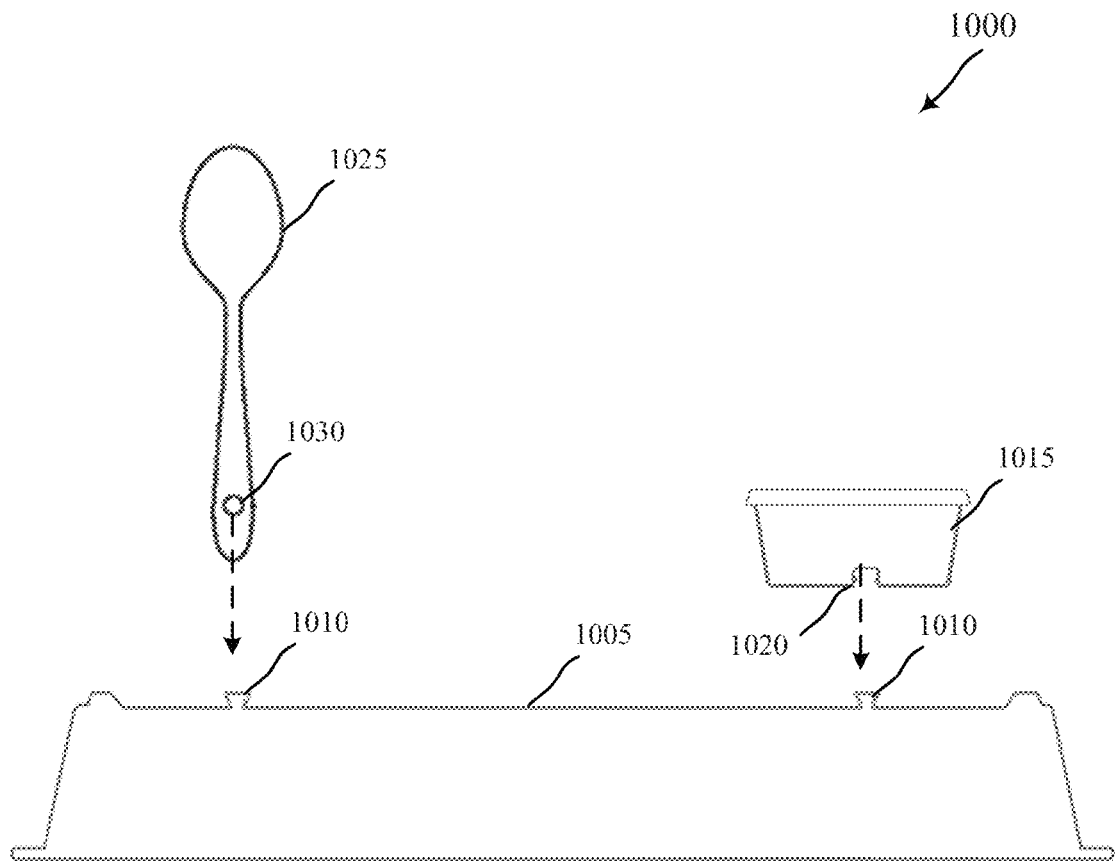
FIG. 10 is a top view of another lid having cutlery and container recesses according to various embodiments.

With reference now to FIG. 10, an exemplary lid 1000 of other embodiments is illustrated. In the example of FIG. 10, the lid 1000 has a top surface 1005 that includes one or more upward projections 1010. These upward projections 1010, may engage with one or more other items to secure the items to the lid 1000 with a frictional engagement with a recess in the other item. In the example of FIG. 10, a cup 1050 includes a recess 1020 that may engage with an upward projection 1010. Similarly, a piece of cutlery 1025 has an aperture 1030 that may fit over an upward projection 1010 to secure the piece of cutlery 1025 to the lid 1000. While the lid 1000 is illustrated with upward projections 1010, in other embodiments lids may have recesses that may receive outward projections of other items, and thereby secure the items to the lid in a similar manner. For example, lid 1000 may have a recess that is configured to receive an outwardly extending nub of a piece of cutlery 1025. Additionally, the piece of cutlery 1025 may include an aperture that is configured to receive an outwardly extending nub of another piece of cutlery, thereby allowing multiple pieces of cutlery to be secured together and secured to a lid, such as lid 1000. In still further embodiments, lids may have combinations of upward projections and recesses that may be used to secure various items with the lid. Additionally, in still further embodiments, a base of the associated container may have a recess or projection that is configured to engage with a projection or recess of a lid, thereby allowing stacking of multiple containers in a manner that the containers may be secured to each other to provide for easier and more reliable transport.

Figure 11:
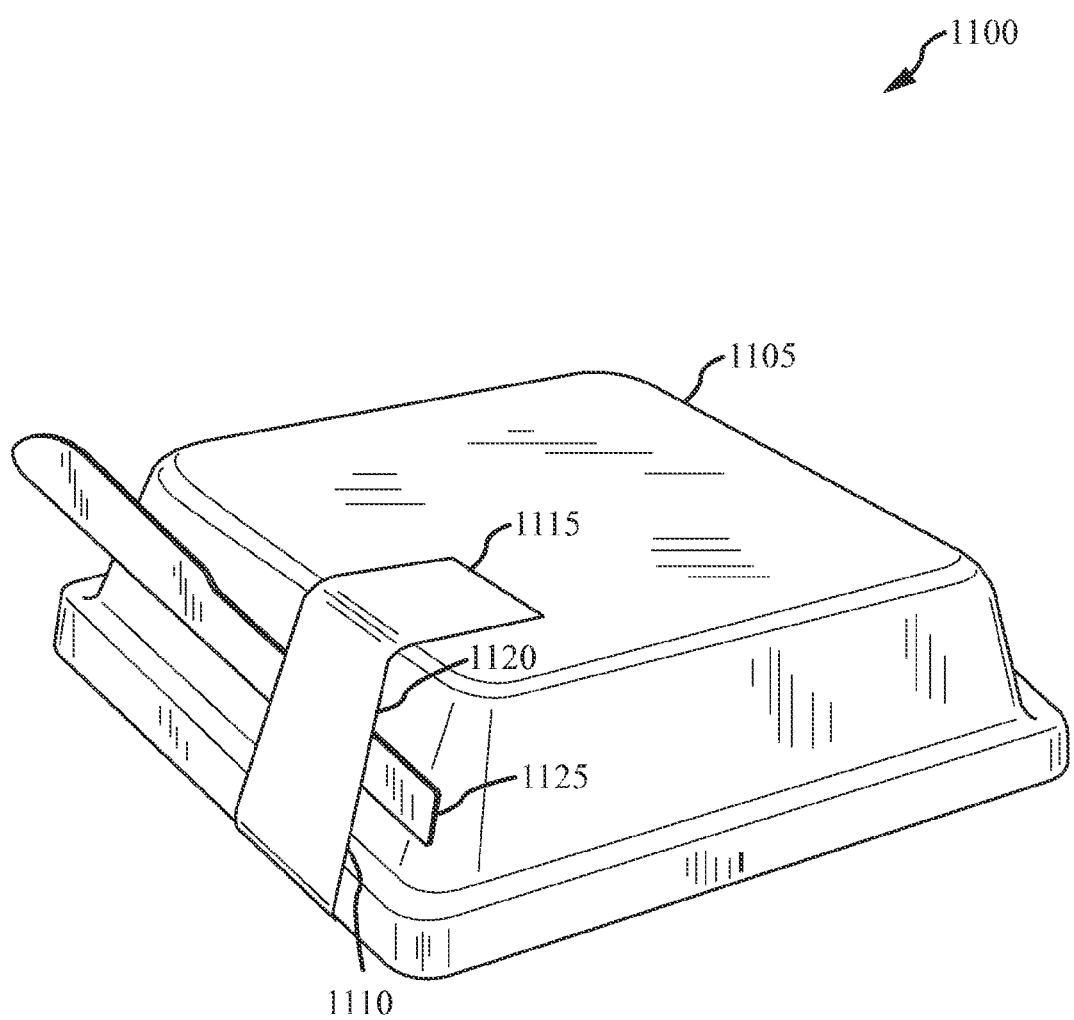
FIG. 11 is a perspective view of a lid and an associated closure mechanism according to various embodiments.

With reference now to FIG. 11, a perspective view of a lid and closure mechanism 1100 is described for various embodiments. In the example of FIG. 11, lid 1105 may be secured to a base (not shown) by a closure mechanism 1110. The closure mechanism 1110 may engage with lid 1105 through a tab 1115. The tab 1115 (or other portion of the closure mechanism 1110) may include projections that engage with one or more cavities of the lid 1105 to provide a frictional fit that secures the closure mechanism 1110 to the lid 1105, and thereby secure the lid 1105 to the base. In some embodiments, the tab 1115 (or other portion of the closure mechanism 1110) may include apertures, with corresponding portions of the lid 1110 having projections that may engage with the apertures to provide a frictional fit that secures the closure mechanism 1110 to the lid 1105, and thereby secure the lid 1105 to the base. In still further embodiments, a portion of the tab 1115 may be inserted into a slit in the lid 1105 to secure the closure mechanism 1110 to the lid 1105, and thereby secure the lid 1105 to the base. Of course, various other techniques may be used to secure such a closure mechanism 1110 to the lid 1105, as will be readily appreciated by one of skill in the art. The closure mechanism 1110 may be secured to the base in any appropriate manner, such as through a frictional fit with projections and/or cavities of the base that engage with apertures and/or projections of the closure mechanism, adhesive or other bonding, or through being molded with the base during manufacturing, to name but a few examples.

In the example of FIG. 11, the closure mechanism 1110 also includes a utensil engagement portion 1120 that may be used to secure a utensil 1125 to the container 1100. In some embodiments, the lid 1105 may include a recess that can receive a second container, such as a soufflé cup, for example, with this recess being covered by the tab 1115 of the closure mechanism 1110. In such a manner, a second container may be secured with the lid 1105 and container. Lid 1105 may be made of any of a number of suitable materials, such as plastic, foam, or a paper or pulp based material. In some embodiments, lid 1105 is formed of a transparent plastic material to provide convenient viewing of food items located in the container. Similarly, the closure mechanism 1110 may be made of any of a number of suitable materials, such as plastic, foam, or a paper or pulp based material. The lid 1105 and/or closure mechanism 1110 may be configured to engage with the bottom portion of a base, in a similar manner as described above, to provide for more secure and stable stacking of multiple containers.

In some embodiments, the closure mechanism 1110 may be a separate item from the base and lid 1105, thus providing flexibility for an end user as to whether such a closure mechanism 1110 may be used in a particular situation. In some embodiments, different closure mechanisms 1110 may be provided that may or may not include a utensil engagement portion 1120 that may secure a utensil to 1125 to the container when such a closure mechanism is used. In still further embodiments, different utensils may be secured to different closure mechanisms, and a user may select the appropriate closure mechanism based on the particular food that is in the container. For example, if a container is used to carry a salad, a closure mechanism having a fork secured thereto may be selected, and if a container is used to carry soup a closure mechanism having a spoon secured thereto may be selected. Furthermore, such a closure mechanism may be configured to work with multiple different sizes and shapes of containers that may be used at an establishment that provides food, for example.

Figure 12A:
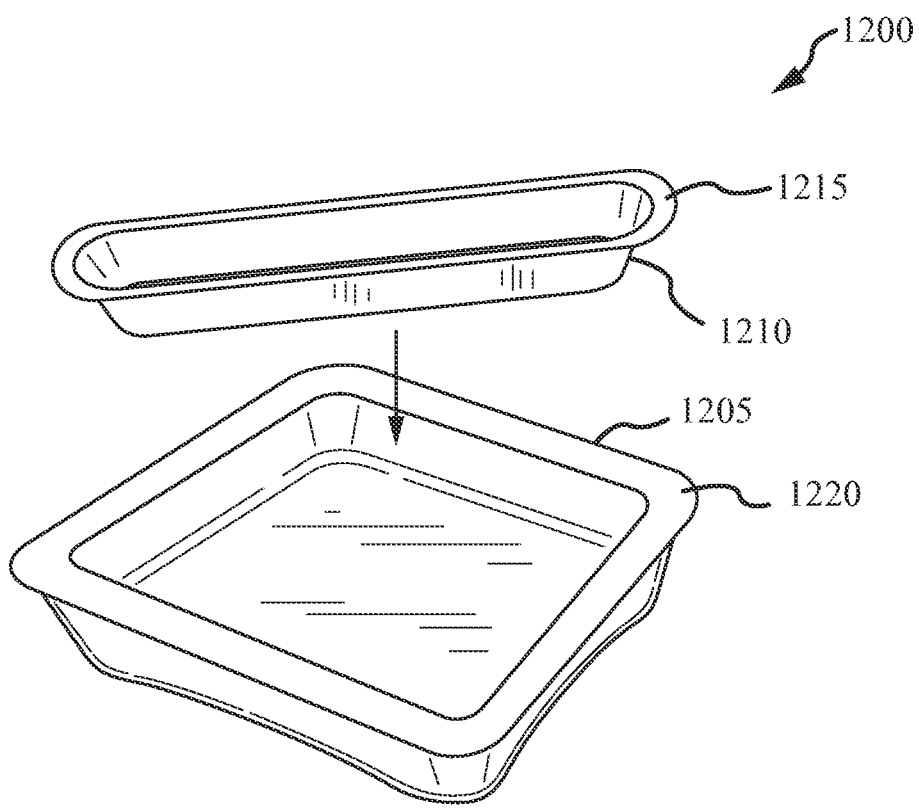
FIG. 12A is a perspective view of a base and associated insert according to various embodiments.
Figure 12B:
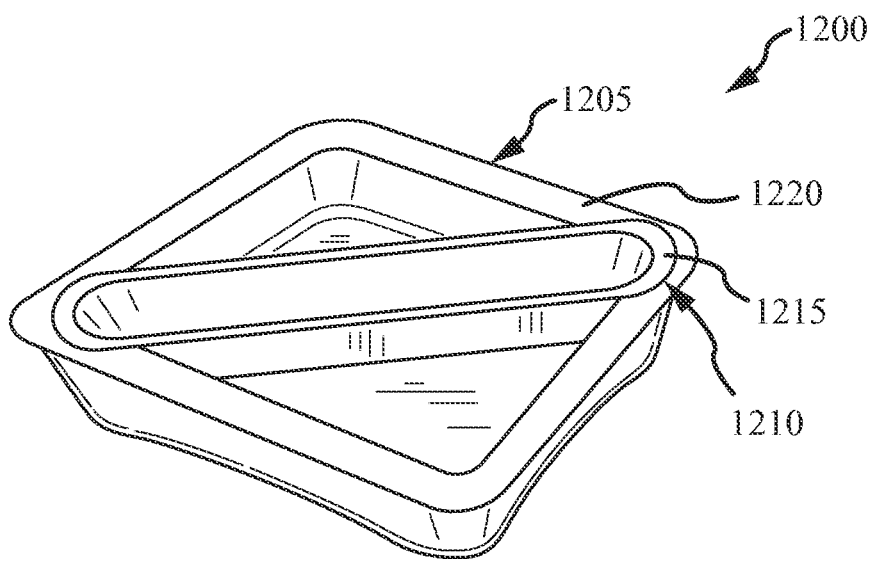
FIG. 12B is a perspective view of a base and associated insert located within the base according to various embodiments.

With reference now to FIGS. 12A and 12B, a container system 1200 for other embodiments is described. The system 1200 of FIG. 12 includes a container base 1205 and an insert 1210 that may be placed in the container. The insert 1210 may be placed in the base 1205, and is sized and shaped to fit within the base 1205. In the example of FIGS. 12A and 12B, the insert 1210 is sized and shaped to fit in a diagonal configuration within the base 1205, although in other examples the insert 1210 may fit into base 1205 in a different configuration. The insert 1210 may hold a topping, dressing, or sauce, for example, for a food that is located in the base 1205. A lid may be secured to the base 1205 to enclose the base 1205 and insert 1210. In the example of FIG. 12, the insert 1210 includes a lip 1215 that extends around a periphery thereof, and rests on a corresponding lip 1220 of the base 1205. In some embodiments, a lid may be secured to the base 1205 that extends around both lips 1215 and 1220 and acts to secure the insert 1210 within the base 1205. In other embodiments, the lip 1220 may include one or more detents or troughs that engage with corresponding features of the insert lip 1215 to help secure the insert 1210 within the base 1205. Furthermore, in some embodiments, the insert 1210 and/or base 1205 also may include dividing partitions. In such a manner, a particular container 1200 may be used with different inserts which may have different, or no, dividing partitions based on the particular use desired for the container 1200. The insert 1210, in some embodiments, may be configured to hold one or more utensils. In such embodiments, one or more utensils may be placed in the cavity formed in the insert 1210, or the insert 1210 may have two (or more) cavities, one of which holds one or more utensils and one or more of which holds a topping or dressing, for example. The insert 1210 may be formed from any number of materials, such as described in more detail below. In some embodiments, the insert 1210 may be formed of compostable or biodegradable material, such as Polylactic acid (PLA) plastic.

Containers such as described according to embodiments of the present disclosure may be formed of various materials, which may be selected based on the needs and anticipated use of the containers. In some embodiments, a container base, such as base 110 or base 1205, may be formed from a compostable material, and the lid, such as lid 105 or lid 1105, may be formed from a clear plastic material. In other embodiments, both the base and lid may be formed of plastic material or compostable materials. In embodiments that include a closure mechanism and/or insert, the closure mechanism or insert may be formed of any such material as well. Compostable materials may include pulped compostable material, such as bagasse material (sugarcane), recycled corrugate, shredded straw, or shredded bamboo, to name but a few examples. Containers, or selected portions of containers such as base, may be fabricated by preparing a slurry of the pulped material, which is placed into a screen having a shape that corresponds to the shape of the base. A complimentary press may be pressed into the screen to press the pulped material into the desired shape of the container, and may be heated to remove a substantial amount of liquid from the slurry and pulped material to thereby form the container. The container may be removed from the screen, and trimmed as necessary to form the final container shape. In some embodiments, the screen size is selected to provide an exterior surface texture for the container that provides an easily gripped container. The press may be formed with a smooth surface to provide an inside surface of the container that is smooth and thereby conducive to transport and storage of food items. Of course, other configurations are possible. After the container is fabricated, the inside and/or outside surface may be treated with material to provide desired surface properties, such as by providing a non-stick and liquid-resistant material to the inside and/or outside surface.

It should be noted that the methods and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention. While in many examples, the containers described are recyclable, compostable, or made from renewable resources, in some embodiments different or alternative materials may be used.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A food container, comprising:
   a base comprising a formed cavity having one or more dividing partitions; and
   a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess.

2. The container of claim 1, wherein the recess is configured to receive a cup containing a condiment or topping.

3. The container of claim 1, wherein the lid is coupled to the base through a foldable connection.

4. The container of claim 1, wherein at least one of the base and lid are formed from a plastic material.

5. The container of claim 1, wherein the base is formed from a compostable material.

6. The container of claim 5, wherein the compostable material comprises pulped organic material.

7. The container of claim 6, wherein the pulped material is selected from one or more of: bagasse material, recycled corrugate, shredded straw, or shredded bamboo.

8. A food container, comprising:
a base; and
a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess, wherein the lid further comprises a second recess configured to receive a third container.

9. The container of claim 8, wherein the first and second recesses are different sizes and configured to receive different sized second and third containers.

10. The lid of claim 8, wherein at least one of the first and second recesses is configured to receive a cup containing a condiment or topping.

11. The container of claim 8, wherein the base is formed from a compostable material.

12. The container of claim 8, wherein at least one of the base and lid are formed from a plastic material.

13. A food container, comprising:
a base; and
a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess, wherein the lid further comprises a second recess configured to receive one or more items of cutlery.

14. A food container, comprising:
a base; and
a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess, wherein the lid further comprises at least one projection extending from a bottom portion of the recess and configured to engage with a complimentary recess of the second container.

15. A food container, comprising:
a base; and
a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess, wherein the lid further comprises at least one upward projection configured to engage with an aperture of an item of cutlery.

16. A food container, comprising:
a base;
a lid configured to be joined with the base, and comprising a recess configured to receive a second container that is accessible while the lid is joined with the base, wherein a bottom of the recess is located at or above a bottom plane of the lid and wherein the recess has a depth that corresponds to a height of the second container such that the top of the second container is located at or below a top opening of the recess when the second container is located in the recess; and
a closure mechanism coupled with the base that engages with the lid to secure the lid to the base, wherein the closure mechanism comprises a utensil engagement portion that secures a utensil to the container.

17. A lid for a food container, comprising:
a top surface;
first and second recesses in the top surface configured to receive a second container and a third container that are accessible while the lid is joined with a base, wherein a bottom of each recess is located at or above a bottom plane of the lid and wherein each recess has a depth that corresponds to a height of the second and third container such that the tops of the second and third containers are located at or below a top opening of each recess when the second and third containers are located in the recesses; and
at least one upward projection that projects from the top surface and is configured to engage with an aperture of an item of cutlery.

18. The lid of claim 17, wherein at least one of the first and second recesses is configured to receive a cup containing a condiment or topping.

19. The lid of claim 17, wherein the first and second recesses are different sizes and configured to receive different sized second and third containers.

20. A lid for a food container, comprising:
a top surface;
first and second recesses in the top surface configured to receive a second container and a third container that are accessible while the lid is joined with a base, wherein a bottom of each recess is located at or above a bottom plane of the lid and wherein each recess has a depth that corresponds to a height of the second and third container such that the tops of the second and third containers are located at or below a top opening of each recess when the second and third containers are located in the recesses; and
at least one upward projection that projects from the top surface and is configured to engage with an aperture of an item of cutlery,
wherein the at least one upward projection comprises a first upward projection configured to engage with the aperture of the item of cutlery, and a second upward projection extending from a bottom portion of either of the first or second recess that is configured to engage with a complimentary recess of either of the second or third container.

21. The lid of claim 20, wherein the second upward projection and complementary recess engage and provide a frictional engagement to secure the second or third container to the lid.

22. The lid of claim 20, wherein at least one of the second or third container is a soufflé cup.

\* \* \* \* \*